United States Patent
Brewer

(10) Patent No.: US 10,814,472 B2
(45) Date of Patent: Oct. 27, 2020

(54) VEHICLE MOUNTABLE ROBOTIC AND COMMUNICATION SYSTEMS

(71) Applicant: SRI International, Menlo Park, CA (US)

(72) Inventor: Reuben Brewer, Millbrae, CA (US)

(73) Assignee: SRI International, Menlo Park, CA (US)

( * ) Notice: Subject to any disclaimer, the term of this patent is extended or adjusted under 35 U.S.C. 154(b) by 0 days.

(21) Appl. No.: 16/712,953

(22) Filed: Dec. 12, 2019

(65) Prior Publication Data

US 2020/0269414 A1 Aug. 27, 2020

Related U.S. Application Data

(60) Provisional application No. 62/811,335, filed on Feb. 27, 2019.

(51) Int. Cl.
| | |
|---|---|
| B25J 5/00 | (2006.01) |
| H04R 1/08 | (2006.01) |
| H04R 1/02 | (2006.01) |
| H04N 7/14 | (2006.01) |
| B25J 9/16 | (2006.01) |
| B60T 3/00 | (2006.01) |
| H04N 5/225 | (2006.01) |
| E01F 13/12 | (2006.01) |

(52) U.S. Cl.
CPC ............. *B25J 5/007* (2013.01); *B25J 9/1697* (2013.01); *B60T 3/00* (2013.01); *H04N 5/2253* (2013.01); *H04N 7/141* (2013.01); *H04R 1/028* (2013.01); *H04R 1/08* (2013.01); *E01F 13/12* (2013.01)

(58) Field of Classification Search
CPC ...... B25J 5/00; B25J 9/16; H04R 1/08; H04R 1/02; H04N 5/225; H04N 7/14

USPC ............................ 348/14.01–14.16; 700/257
See application file for complete search history.

(56) References Cited

U.S. PATENT DOCUMENTS

| | | | |
|---|---|---|---|
| 7,168,906 B2 | 1/2007 | Weatherford | |
| 7,591,477 B2 | 9/2009 | Pohler | |
| 7,642,899 B2 | 6/2010 | Alvarado et al. | |
| 7,896,113 B1 * | 3/2011 | Ramirez | B25J 5/005 |
| | | | 180/9 |

(Continued)

OTHER PUBLICATIONS

YouTube, "GoBetween Robotics: A traffic stop robot to keep everyone safe," uploaded by SRI International, May 1, 2019, accessed from https://www.youtube.com/watch?v=61xTQ3Bg5XI, 1 pp.

*Primary Examiner* — Melur Ramakrishnaiah
(74) *Attorney, Agent, or Firm* — Shumaker & Sieffert P.A.

(57) ABSTRACT

The disclosure describes vehicle mountable robotic and communication systems and techniques that can facilitate communications between a police officer and a driver within vehicles in a manner that removes the police officer from a proximity of the driver and enables real-time communication between the police officer and the driver. A vehicle mountable robotic and communication system can deliver a communication device from a police vehicle to a driver vehicle so that the police officer and the driver may remain separated during part or all of a traffic stop or other temporary detention. This communication device can provide a sensory or communicative interface to permit the police officer to collect additional information of the environment of the driver and/or permit the police officer and the driver to engage in two-way communication.

20 Claims, 8 Drawing Sheets

(56) References Cited

U.S. PATENT DOCUMENTS

| | | | |
|---|---|---|---|
| 9,471,059 B1 | 10/2016 | Wilkins | |
| 2006/0215589 A1* | 9/2006 | Taborisskiy | H04N 7/141 |
| | | | 370/310 |
| 2008/0091309 A1 | 4/2008 | Walker | |
| 2008/0314693 A1* | 12/2008 | Van Aspert | B60T 3/00 |
| | | | 188/32 |
| 2010/0156080 A1 | 6/2010 | Napier | |
| 2011/0202224 A1* | 8/2011 | Thompson | G05D 1/0227 |
| | | | 701/26 |
| 2018/0222059 A1* | 8/2018 | Ragula | B25J 5/007 |

* cited by examiner

VEHICLE MOUNTABLE ROBOTIC AND COMMUNICATION SYSTEMS

This application claims the benefit of U.S. Provisional Patent Application 62/811,335 entitled "ROBOTIC SYSTEM" and filed on Feb. 27, 2019, the entire content of which is incorporated herein by reference.

TECHNICAL FIELD

The disclosure describes robotic and communication systems, in particular, vehicle mountable robotic and communication systems.

BACKGROUND

Temporary detentions by administrative agents, such as traffic stops of drivers by police officers, can present many dangers for both the administrative agent and the subject of the temporary detention. As an example, a police officer approaching an unknown driver can face risks from the environment, such as a risk of being struck by a passing vehicle, or risks from the driver, such as a risk of a driver speeding-off as the police officer approaches the vehicle, or a driver who could be armed and dangerous. The driver stopped by the police officer can also face risks from the environment, such as the risk of being injured by a passing vehicle, or risks from the police officer, such as injury from the police officer due to a misunderstanding that could arise from uncertainty or fear.

Some of these risks can be mitigated through improved safety processes, such as a process in which the driver commands a vehicle to exit a freeway before stopping or a process in which the police officer approaches the passenger-side window of the vehicle away from traffic. Other risks, such as risks associated with direct interactions between the police officer and the driver, can be mitigated by enhanced police training. However, such police training may not address all risks associated with a temporary detention, such as risks associated with asymmetrical information possessed by the police officer and the driver.

SUMMARY

Described herein are vehicle-mounted apparatuses that can reduce a risk to an administrative agent during a temporary detention. In general, the disclosure describes vehicle mountable robotic and communication systems and techniques that can facilitate communications between a police officer and a driver within vehicles in a manner that removes the police officer from a proximity of the driver during all or a portion of the temporary detention and enables real-time communication between the police officer and the driver during the temporary detention. A vehicle mountable robotic and communication system can deliver a communication device from a police vehicle to a driver vehicle so that the police officer and the driver may remain separated during part or all of a traffic stop or other temporary detention. This communication device can provide a sensory or communicative interface to permit the police officer to collect additional information of the environment of the driver and/or permit the police officer and the driver to engage in two-way communication. While the driver can use the communication system while seated in his/her car, the police officer can use the communication system from either inside or outside of his/her vehicle through use of a wireless interface. In this way, the vehicle mountable robotic and communication system can extend or supplement collection and/or transmission of information during a temporary detention.

The systems and techniques discussed herein can provide one or more technical advantages that enable at least one practical application. For example, a vehicle mountable robotic and communication system can increase the safety of police officers and drivers without significantly affecting the human-to-human interactions. As one example, the systems and techniques discussed herein can protect police officers and/or drivers from risks associated with an environment. Because the officer and the driver remain separate and/or in their respective vehicles during part or all of a traffic stop conducted through the communication device, the techniques can reduce a likelihood or severity of the police officer and/or driver being struck by a passing vehicle. As another example, the systems and techniques discussed herein can provide a safe communication environment between the police officer and the driver. By removing the police officer from a proximity of the driver during part or all of a traffic stop, a vehicle mountable robotic and communication system can reduce a likelihood or severity of injury from a miscommunication that may be exacerbated by physical presence of the police officer in physical proximity to the driver. As another example, the systems and techniques discussed herein can preserve existing procedures conducted during traffic stops by permitting real-time one-way or two-way communication. As another example, the system and techniques discussed herein can provide additional functions outside communication that can be useful for a traffic stop. For example, a vehicle mountable robotic and communication system can deploy an immobilization device to prevent the driver from fleeing the scene once pulled over. The robotic and communication system can be adapted to a vehicle without modifying the existing vehicle architecture. For example, the robotic and communication system can be mounted at a variety of locations on a vehicle, including existing support structures such as racks and bull bars.

In one example, this disclosure describes a vehicle mountable robotic and communication system that includes a communication device and a delivery device. The communication device is configured to capture data from an interior and exterior environment of a first vehicle (e.g., a detained vehicle), capture user input from an occupant of the first vehicle, and transmit the data and the user input to a second vehicle (e.g., a police vehicle). The delivery device is configured to position the communication device proximate to the first vehicle.

In another example, this disclosure describes a method that includes positioning, by a delivery device, a communication device proximate to a first vehicle (e.g., a detained vehicle). The method further includes capturing, by the communication device, data from an interior and exterior environment of the first vehicle and user input from an occupant of the first vehicle. The method further includes transmitting, by the communication device, the data and the user input to a second vehicle (e.g., a police vehicle).

The details of one or more examples of the techniques of this disclosure are set forth in the accompanying drawings and the description below. Other features, objects, and advantages of the techniques will be apparent from the description and drawings, and from the claims.

DETAIL DESCRIPTION

Figure 1:
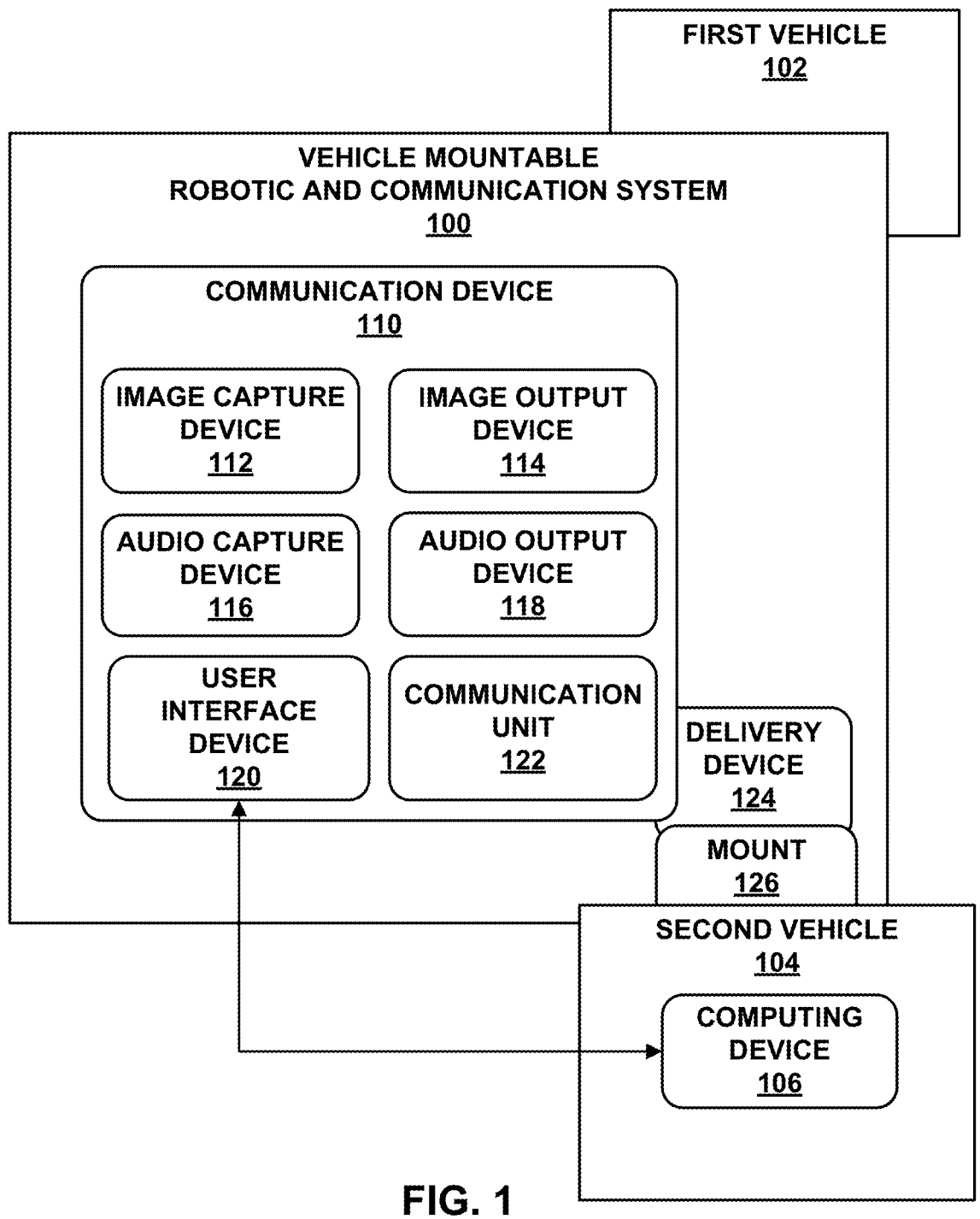
FIG. 1 is a block diagram illustrating an example vehicle mountable robotic and communication system for facilitating communications between an occupant of a first vehicle and an occupant of a second vehicle, in accordance with one or more aspects of the present disclosure.

In examples described herein, a vehicle mountable robotic and communication system includes a communication device configured to facilitate communications between an occupant of a first vehicle, such as a driver in a detained vehicle during a temporary detention (e.g., a temporary traffic detention, an administrative stop, a border check, a cargo inspection, etc.), and an occupant of a second vehicle, such as a police officer in a police vehicle. The vehicle mountable robotic and communication system also includes a delivery device configured to extend the communication device from the police vehicle to the detained vehicle and a mount configured to secure the delivery device to the police vehicle. For example, the mount can be mounted at a driver-side or front of the police vehicle. The delivery device can extend the communication device from the police vehicle to the detained vehicle to deliver the communication device. When the communication device is proximate to the detained vehicle, the communication device can capture data, such as image or audio data, from an interior and/or exterior of the detained vehicle or can capture user input from the occupant of the detained vehicle. The communication device can also transmit the captured data and captured user input to the police vehicle.

In this way, vehicle mountable robotic and communication systems described herein can facilitate communications between an occupant of a first vehicle, such as a driver in a detained vehicle, and an occupant of a second vehicle, such as a police officer in a police vehicle, while allowing both the police officer and the driver to remain in their respective vehicles without significantly affecting the human-to-human interactions between the police officer and the driver. For example, a driver may have certain expectations as to various procedures and norms regarding behavior and interaction during a temporary traffic detention. The vehicle mountable robotic and communication systems can maintain various modes of communication, such as real-time two-way communication with the driver seated in the vehicle, to preserve these expectations of the driver regarding the temporary traffic detention and reduce the uncertainty of the driver. At the same time, the vehicle mountable robotic and communication systems can enable the police officer and the driver to maintain separation throughout the temporary traffic detention, such that the police officer may remain in the police vehicle, or until the police officer determines that the environment in and around the vehicle is secure, such that the police officer may exit the police vehicle with reduced uncertainty as to dangers that may present during the temporary detention. As an example, while the driver, while seated, uses the vehicle mountable robotic and communication system in the detained vehicle, the police officer can use the vehicle mountable robotic communication system from either inside or outside of the police vehicle through use of a wireless interface.

FIG. 1 is a block diagram illustrating an example vehicle mountable robotic and communication system 100 for facilitating communication between an occupant of a first vehicle 102 and an occupant of a second vehicle 104, in accordance with one or more aspects of the present disclosure. In the example of FIG. 1, vehicle mountable robotic and communication system 100 includes communication device 110, delivery device 124, and mount 126.

In some examples, second vehicle 104 may be a vehicle belonging to a detaining entity, such as a police officer, and first vehicle 102 may be a vehicle belonging to an individual being detained by the detaining entity, such as a driver suspected of an infraction. In such examples, vehicle mountable robotic and communication system 100 can be configured to facilitate communication between first vehicle 102 and second vehicle 104 so that procedures associated with the temporary traffic detention can be followed with a reduced likelihood or severity of incident between the police officer and the driver or another occupant of first vehicle 102. While the below examples may be described with respect to a detaining entity temporarily detaining an individual, in other examples, vehicle mountable robotic and communication system 100 may be configured to facilitate communication between other entities and/or for other purposes. For example, vehicle mountable robotic and communication system 100 can facilitate communication in any temporary detention event involving two-way communication in which physical proximity between a detaining entity and a detained entity may increase the risk of injury. As one example, vehicle mountable robotic and communication system 100 can facilitate communication between a police officer in a police vehicle and a driver in a detained vehicle during a traffic stop, in which dangers from both the detained vehicle and other vehicles may be present. As another example, vehicle mountable robotic and communication system 100 can facilitate communications between vehicles at a border crossing.

Second vehicle 104 can include any vehicle capable of transporting and securing vehicle mountable robotic and communication system 100 during operation including, but not limited to, automobiles, boats, and the like. For example, second vehicle 104 can be configured to house part or all of vehicle mountable robotic and communication system 100, transport vehicle mountable robotic and communication system 100 to various locations, and operate vehicle mountable robotic and communication system 100 while remaining relatively stationary and/or stable.

Second vehicle 104 can include computing device 106. Computing device 106 can be configured to send control signals to delivery device 124 and communication device 110, send data to communication device 110, receive data from communication device 110, and process sent or received data. Computing device 106 can include any of a wide range of devices, including control circuitry, processors (e.g., one or more microprocessors, one or more application specific integrated circuits (ASICs), one or more field programmable gate arrays (FPGAs), or the like), processing circuitry, one or more servers, one or more desktop computers, one or more notebook (i.e., laptop) computers, one or more cloud computing clusters, or the like. The functions attributed to the controllers and processors described herein can be provided by a hardware device and embodied as software, firmware, hardware, or any combination thereof. In some examples, computing device 106 can be communicatively coupled to an interface system, such as interface system 800 of FIG. 8, that includes one or more devices in second vehicle 104 used for positioning communication device 110 and/or communicating through communication device 110.

Communication device 110 can be configured to capture data from an interior and exterior environment of first vehicle 102 and capture user input from an occupant of first vehicle 102. Communication device 110 can include one or more devices that facilitate communication between an occupant in second vehicle 104 and an occupant in first vehicle 102 and/or collect information from an environment (e.g., an interior and/or exterior) of first vehicle 102. For example, communication device 110 can represent an extension, enhancement, or supplement to various functions performed and/or senses used by a police officer or other detaining entity during a temporary detention. In the example of FIG. 1, communication device 110 includes image capture device 112, image output device 114, audio capture device 116, audio output device 118, user interface device (UID) 120, and communication unit 122; however, communication device 110 can include other devices, as will be described below.

Communication unit 122 can be configured to transmit data and user input to second vehicle 104. Communication unit 122 of communication device 110 can be configured to communicate with computing device 106 of second vehicle 104 via one or more wired and/or wireless networks or connections by transmitting and/or receiving network or control signals over the one or more networks or connections. For example, communication unit 122 can be configured to receive sensor data, such as image or audio data captured from an interior or exterior environment of second vehicle 104 and transmit the sensor data to other devices, such as image output device 114 or audio output device 118, for presentation to an occupant of first vehicle 102. As another example, communication unit 122 can be configured to receive input data, such as input data from a user interface device (UID) 120 from an occupant of first vehicle 102, and transmit the input data to computing device 106 for presentation to an occupant of second vehicle 104. Examples of communication units 122 include a network interface card (e.g., such as an Ethernet card), an optical transceiver, a radio frequency transceiver, a global positioning satellite (GPS) receiver, or any other type of device that can send and/or receive information.

Image capture device 112 can include an input device (e.g., a camera) configured to capture image data (e.g., still or video images) from the interior and exterior environment of first vehicle 102. For example, image capture device 112 can capture image data of the environment of first vehicle 102 that may otherwise be perceived by a detaining entity physically performing one or more steps of a temporary detention, such as a police officer walking to first vehicle 102 and inspecting first vehicle 102. Image capture device 112 can be a built-in (e.g., "internal") and/or external component of communication device 110, which communication device 110 can utilize to capture or generate still and/or video images. For example, image capture device 112 can be a built-in camera configured to capture still image or real-time video of the occupant of first vehicle 102. In some instances, image capture device 112 can be configured to capture images outside a visible light spectrum. For example, image capture device 112 can be configured to capture thermographic images of infrared radiation. Such infrared image data can permit examination of hidden or other features that may not be visible in images capturing visible light. Image capture device 112 can have various controllable features, such as a flash, focus, aperture, capture rate, and the like, that can be actuated by control signals from second vehicle 104. For example, a police officer in second vehicle 104 can control image capture device 112 via communication unit 122 to zoom and pan until the image capture device 112 is in a desired position.

Image output device 114 can include an output device (e.g., a display) configured to output real-time image data (e.g., one or more still or video images) to the interior or exterior environment of first vehicle 102, such as image data received from second vehicle 104 via communication unit 122. For example, image output device 114 can display images that may otherwise be perceived by a detained entity during one or more steps of a temporary detention, such as images of the detaining entity or images of documentation, such as a proposed citation or instructions. Image output device 114 can include any one or more display devices, such as a liquid crystal display (LCD), dot matrix display, light emitting diode (LED) display, organic light-emitting diode (OLED) display, e-ink, or similar monochrome or color display capable of outputting visible information to the occupant of the detained vehicle. In some examples, image output device 114 can also function as a user interface device 120, such as will be described further below. For example, image output device 114 can be a touchscreen or other pressure-sensitive display in which an occupant of first vehicle 102 can both view images and spatially input a response.

Audio capture device 116 can include an input device (e.g., a microphone) configured to capture audio data from the interior and/or exterior environment of first vehicle 102. For example, audio capture device 116 can capture audio data of the environment of first vehicle 102 that may otherwise be perceived by a detaining entity physically performing one or more steps of a temporary detention.

Audio output device 118 can include an output device (e.g., an audio speaker) configured to output real-time audio data to the interior or exterior of first vehicle 102, such as audio received from second vehicle 104 via communication unit 122. For example, audio output device 118 can output audio that may otherwise be perceived by a detained entity during one or more steps of a temporary detention, such as audio of the detaining entity or automated instructions.

UID 120 can include an input device configured to capture user input data from an occupant of first vehicle 102. For example, UID 120 can receive physical or tactile user input that may otherwise be physically received by a detained entity during one or more steps of a temporary detention, such as an electronic signature from an occupant of the detained vehicle. In some examples, UID 120 can be a presence-sensitive input screen that is touch-sensitive, such as a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. For example, UID 120 can be an electronic signature pad configured to detect a signature of an occupant of first vehicle 102.

While illustrated as an internal component of communication device 110, UID 120 can also represent an external component that shares a data path with communication device 110 for transmitting and/or receiving input. For instance, in one example, UID 120 represents a built-in component of communication device 110 located within and physically connected to the external packaging of communication device 110 (e.g., a screen on a computer). In another example, UID 120 represents an external component of communication device 110 located outside and physically separated from the packaging or housing of communication device 110 (e.g., a touchscreen, etc. that shares a wired and/or wireless data path with communication device 110).

In addition or alternative to the devices illustrated in FIG. 1, communication device 110 can include other devices associated with facilitating communication during a temporary detention. For example, in addition to audio or visual communication between a detaining entity and a detained entity, a temporary detention may involve other procedures, such as an exchange of information, performed by one or both of the detaining and/or detained entities. As such, communication device 110 can include various devices configured to facilitate such procedures. For example, communication device 110 can include a braille communication system, a translation system, or other communication system configured to assist communication for occupants of first vehicle 102.

As one example, communication device 110 can include a physical output device, such as a printer (not shown), configured to output physical objects, such as documentation, to an occupant of first vehicle 102. For example, during a traffic stop, the detaining entity of second vehicle 104 may issue a citation to the occupant of first vehicle 102, such that the citation can be printed and delivered to the occupant of first vehicle 102 without a direct human delivery. The occupant of the first vehicle, prior to or after receiving the citation, can digitally sign the citation, such as using UID 120.

As another example, communication device 110 can include an image scanner (not shown) configured to capture image data from documents provided by an occupant of first vehicle 102. For example, during a traffic stop, the occupant of first vehicle 102 may provide a driver's license that includes a barcode, such that the image scanner can scan the barcode on a backside of the driver's license. In some instances, image capture of documentation can be performed by image capture device 112. For example, communication device 110 can be configured to receive image data of the documentation from image capture device 112 and use Optical Character Recognition (OCR) to extract information from a front of the driver's license.

As another example, communication device 110 can include environmental sensors (not shown) configured to detect a condition of the environment of first vehicle 102. For example, environmental sensors can detect a presence or concentration of various substances, such as smoke or alcohol, that may otherwise be detected by a detaining entity during one or more steps of a temporary detention. Environmental sensors that can be used include, but are not limited to, alcohol sensors, *cannabis* sensors, smoke sensors, temperature sensors (e.g., detect an amount of time first vehicle 102 has been operating), particulate sensors, and the like. In some examples, environmental sensors can detect a presence or concentration of various substances that may not be detected, or may be detected with less sensitivity, by a detaining entity. For example, communication device 110 can include a Geiger counter or other radiation detection device configured to detect a presence of radiation in first vehicle 102.

While components of communication device 110 have been described separately according to various functions, communication device 110 can include a variety of configurations of components. In some examples, communication device 110 can include one or more interfaces for communicating with devices in the custody of an occupant of first vehicle 102. For example, if first vehicle 102 or an occupant of first vehicle 102 has an image capture device or audio capture device, communication device 110 can be configured to communicatively couple to the devices of first vehicle 102, such that image and audio data captured by the devices of first vehicle 102 can be transmitted to second vehicle 104. For example, if first vehicle 102 is stopped next to a road, an occupant of second vehicle 104 may attempt to communicate with an occupant of first vehicle 102 prior to approaching first vehicle 102. As another example, if first vehicle 102 has a configuration that is not compatible with delivery of communication device 110, such as a semi-truck having a long body and/or high window, the occupant of second vehicle 104 may attempt to communicate with the occupant of first vehicle 102 prior to approaching first vehicle 102. In some examples, communication device 110 may include wireless or wired interfaces capable of communicating information with first vehicle 102, such as connections to Bluetooth, auxiliary, or AM/FM-radio inputs of an audio system of first vehicle 102, such that the audio system of first vehicle 102 outputs the police officer's voice. As another example, communication device 110 may include interfaces capable of communicating information with an occupant of first vehicle 102, such as Bluetooth or auxiliary inputs for a telephone.

Using one or more of the various devices discussed above, communication device 110 can be configured to provide a variety of functions related to safely facilitating a temporary detention. For example, a detaining entity and/or detained entity may proceed through various steps during a temporary detention including, but not limited to, information collection by the detaining entity, two-way communication between the detained entity and the detaining entity, information provision by the detained entity, and information provision by the detaining entity. One or more of these steps can be facilitated, supplemented, and/or enhanced using communication device 110.

In some examples, communication device 110 can be configured to facilitate information collection by the detaining entity by capturing and transmitting sensory data. For example, a police officer, while approaching or standing proximate to a vehicle, may collect sensory data regarding the interior and/or exterior environment of first vehicle 102. This sensory data may alert the police officer to the presence or absence of various dangers proximate to first vehicle 102, such as a presence or absence of a weapon in first vehicle 102. Image capture device 112 and audio capture device 116 can collect image and audio data, respectively, from the interior and/or exterior environment of first vehicle 102, one or more environmental sensors can collect environmental data from the environment of first vehicle 102, and/or one or more infrared cameras can collect thermal imaging information from the environment of first vehicle 102. Some of this data, such as image, audio, and/or environmental data, can be data that the detaining entity may be capable of detecting if physical proximate to first vehicle 102. The environmental data can indicate a presence or concentration of an analyte in the environment of the first vehicle, such as alcohol or smoke. In some examples, collection of environmental data can be enhanced, such as by lowering a threshold for collection of environment data due to a higher sensitivity of devices of communication device 110 than human sensory organs or analyzing the environmental data for various features or patterns associated with risk assessment. In some examples, collection of environmental data can include additional environmental data that may not be capable of detection by human sensory organs, such as thermographic image data or various particulates. In this way, communication device 110 can provide a detaining entity with more information for formulating an action.

In some examples, communication device 110 can be configured to record information collected by the detaining entity. For example, communication device 110 can record image data, audio data, and environmental data to provide a more comprehensive record of a temporary detention environment than a record based on recollection of the detaining entity and/or detained entity. This comprehensive record can be stored on any of communication device 110, a storage device in second vehicle 104, or a storage device in a centralized system (e.g., after transmission to the centralized system during or after the temporary detention).

In some examples, communication device 110 can be configured to facilitate two-way communication between the detaining entity and the detained entity. For example, a police officer may wish, or even be required, to communicate regarding the reason for the temporary detention. In addition to streamlining information exchange between the two entities, such two-way communication can provide additional information extraneous to the information exchanged, such as behavioral information of either entity. Image capture device 112 and audio capture device 116 can collect image and audio data, respectively, from an occupant of first vehicle 102, while image output device 114 and audio output device 118 can display image and audio data, respectively, of an occupant of second vehicle 104.

In some examples, communication device 110 can be configured to facilitate information provision by the detained entity and/or the detaining entity. For example, during a traffic stop, a driver may be encouraged or required to provide documentation (e.g., a vehicle insurance card, a vehicle registration card, a driver's license, etc.) regarding operation of first vehicle 102. Similarly, the police officer may be required to provide documentation regarding the temporary detection, such as a warning or citation. Rather than provide this information directly, communication device 110 can facilitate the exchange of such information. User interface device 120 and/or image capture device 112 can provide an interface for providing such documentation between the driver and the police officer.

Communication device 110 can be physically coupled to second vehicle 104 through delivery device 124 and mount 126. Delivery device 124 can include one or more devices configured to deliver communication device 110 from second vehicle 104 (e.g., a police vehicle) proximate to first vehicle 102 (e.g., a detained vehicle), such that communication device 110 can capture data from the interior and/or exterior environment of first vehicle 102. Delivery device 124 can have at least a first configuration (e.g., an undeployed or non-extended configuration of communication device 110) and a second configuration (e.g., a deployed or extended configuration of communication device 110). In the first configuration, communication device 110 can be proximate to second vehicle 104, such that communication device 110 can be stored and/or transported by second vehicle 104. In the second configuration, communication device 110 can be proximate to first vehicle 102, such that communication device 110 can capture data from the interior and/or exterior environment of first vehicle 102. Delivery device 124 can be configured to transform from the first configuration to the second configuration to extend communication device 110 from second vehicle 104 to first vehicle 102. In some examples, in addition to the first and second configuration, delivery device 124 can include intermediate configurations. For example, delivery device 124 can be configured with a third configuration in which communication device 110 can be at another position relative to first vehicle 102, such as above or on a passenger side of first vehicle 102.

Delivery device 124 can include a variety of mechanisms for delivering communication device 110 proximate to first vehicle 102. Such mechanisms can be selected based on a variety of factors including, but not limited to, a weight of components of vehicle mountable robotic and communication system 100, dimensions (e.g., a height, width, and/or length) of second vehicle 104, and the like. Mechanisms that can be used for delivery device 124 can include, but are not limited to, telescoping mechanisms, folding mechanisms, rolling mechanisms, everted tubes, and the like. Some example mechanisms will be described further in FIGS. 2-5 below. Delivery device 124 can be configured to extend communication device 110 from second vehicle 104 to a position proximate to a driver-side window of first vehicle 102. As such, delivery device 124 can extend a length representing a distance between mount 126 to the driver-side window of first vehicle 102. For example, when conducting a traffic stop, a police vehicle may pull up proximate to the detained vehicle, such that a front-end of the police vehicle is close to (e.g., within three feet) of the detained vehicle. As such, delivery device 124 can extend a distance based on a position of mount 126 on second vehicle 104, a size of second vehicle 104, an anticipated distance between first vehicle 102 and second vehicle 104, and a size of first vehicle 102. In some examples, delivery device 124 can be configured to extend to a maximum distance between about eight feet and about twenty feet.

In some examples, vehicle mountable robotic and communication system 100 can include one or more immobilization devices configured to assist in preventing movement of first vehicle 102. As an example, vehicle mountable robotic and communication system 100 can include an immobilization device configured to be positioned in front of a wheel of first vehicle 102. The immobilization device can impede the movement of the wheel, such as by restraining the wheel against movement or puncturing the wheel in response to movement of first vehicle 102. In some examples, the immobilization device comprises a spike panel. For example, the spike panel can extend from a portion of delivery device 124 as delivery device 124 is deployed into position and retract as delivery device 124 is retracted from position.

Mount 126 can include a mounting mechanism configured to secure delivery device 124 to second vehicle 104. Mount 126 can be coupled to second vehicle 104 at a variety of locations including, but not limited to, a roof, a hood, a grill, a bull bar, and the like. A variety of mounting mechanisms can be used including, but not limited to, a frame mounted mechanism, a rack mounted mechanism, and the like. In some examples, mount 126 can include a tie-down bracket located at a driver-side of second vehicle 104, as described in further detail below with reference to FIG. 2. Alternatively, mount 126 can represent a bull bar located at the front of second vehicle 104, as described in further detail below with reference to FIG. 3.

By installing vehicle mountable robotic and communication system 100 on vehicle 104, vehicle mountable robotic and communication 100 can be deployed on various types of terrains, and the risk of damaging communication device 110 can be lowered as the communication device is not detached from vehicle 104. For example, a system in which communication system 100 is towed by or released from second vehicle 104 (e.g., a mobile robot that detaches from second vehicle 104 and drives, flies, or walks to first vehicle 102) may risk damage to communication system 100, as communication system 100 may be run over, stuck in terrain like potholes or mud, or blown away by wind. Furthermore, there is also less likelihood of damage to communication device 110 as well as less likelihood of communication device 110 being left behind because communication system 110 is not allowed to freely translocate from second vehicle 104 to first vehicle 102. Rather, by incorporating communication system 100 onto second vehicle 104 through mount 126, communication system 100 may be traversed across any terrain that second vehicle 104 may be capable of traversing with minimal risk to the communication system 100.

Vehicle mountable robotic and communication system 100 can include one or more positional sensors configured to assist an occupant of second vehicle 104 with positioning second vehicle 104 proximate to first vehicle 102, such that delivery device 124 can deliver communication device 110 to a desired position relative to first vehicle 102. For example, the second, deployed configuration of delivery device 124 can correspond to a range of positions of second vehicle 104 relative to first vehicle 102 (e.g., along a width, length, or height of first vehicle 102). The positional sensors can be configured to assist second vehicle 104 and/or a driver of second vehicle 104 with positioning second vehicle 104 relative to first vehicle 102 in the range of positions such that communication device 110 can be delivered to a desired position proximate to first vehicle 102.

As an example of operation of vehicle mountable robotic and communication system 100, a police officer in second vehicle 104 (i.e., the police vehicle) can indicate to the driver in first vehicle 102 (i.e., the detained vehicle) to pull over by actuating police lights, a bullhorn, or other mechanisms to alert the driver. The police officer may operate second vehicle 104 to approach first vehicle 102 to a relatively close position. The police officer may then send a control signal to delivery device 124 to control deployment of delivery device 124, and thus a position of communication device 110, to extend communication device 110 from second vehicle 104 to first vehicle 102. The police officer may then send a control signal to delivery device 124 to deliver communication device 110 from second vehicle 104 to an occupant in first vehicle 102, such as by raising or lowering communication device 110.

In some examples, communication device 110 can be used for preliminary information collection, such as by collecting data at one or more intermediate positions of communication device 110 between first vehicle 102 and second vehicle 104, or for information recording, such as by recording data throughout the temporary detention. Once communication device 110 has been delivered, the police officer may leave communication device 110 proximate to first vehicle 102, such as to record interactions during the temporary detention, and approach first vehicle 102 to continue to carry out procedures regarding the temporary detention.

Figure 8:
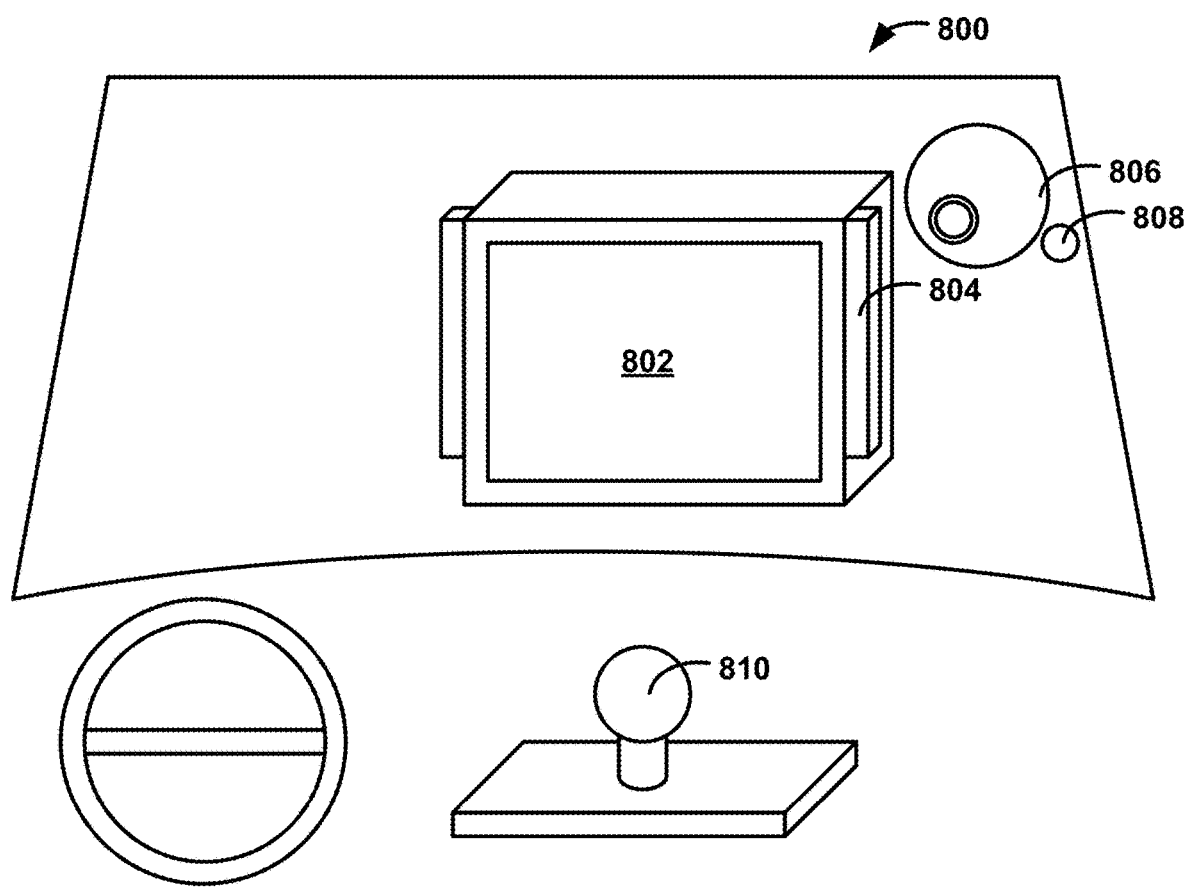
FIG. 8 is a perspective view diagram of an example interface system 800 of a second vehicle for communicating with and controlling a communication device, in accordance with embodiments discussed herein.

In response to receiving communication device 110, the occupant in first vehicle 102 may communicate with the police officer in second vehicle 104 via communication device 110. Communication device 110 can include various devices configured to capture data from the interior and/or exterior environment of first vehicle 102, as described above. Example devices can include, but not limited to, speakers, cameras, microphones, passive alcohol sensor detectors, driver's license barcode scanner, electronic signature pad, mobile printer, and any other suitable devices. The occupant in first vehicle 102 can receive real-time video and audio of the police officer in second vehicle 104 via a built-in camera and microphone, such as illustrated in FIG. 8 below. The police officer may request the occupant to provide the occupant's driver's license, registration, and proof of insurance. In response, the occupant may hold the occupant's driver's license in front of an image scanner for the image scanner to detect optically and hold the registration and proof of insurance in front of image capture device 112 for the police officer to inspect visually. Once the police officer has finalized the citation, the police officer may present the specifics of the citation to the driver via a display device and may ask the occupant to sign the citation via UID 120 electronically, such as an electronic signature pad. The police officer may then provide a hardcopy of the citation for the occupant using a mobile printer. Throughout the encounter, the police officer may communicate with the driver via image output device 114 and audio output device 118. A third party (e.g., another officer, a mental-health worker, a friend, a family member, etc.) with a communication device may also communicate with the police office and driver via image output device 114 and audio output device 118 by connecting with communication device 110. By connecting with communication device 110, the third party may assist in de-escalating an encounter between the police officer and the driver.

In this way, delivery device 124 can deliver communication device 110 from second vehicle 104 to first vehicle 102 to facilitate communications between an occupant of first vehicle 102, such as a driver in a detained vehicle, and an occupant of second vehicle 104, such as a police officer in a police vehicle. As such, the police officer and the driver may maintain separation throughout the temporary traffic detention or until the police officer determines that the environment in and around the vehicle is secure and safe to approach. As an example, while the driver uses communication device 110 while seated in vehicle 102, the police officer can use communication device 110 from either inside or outside of vehicle 104 through use of a wireless interface.

Figure 2:
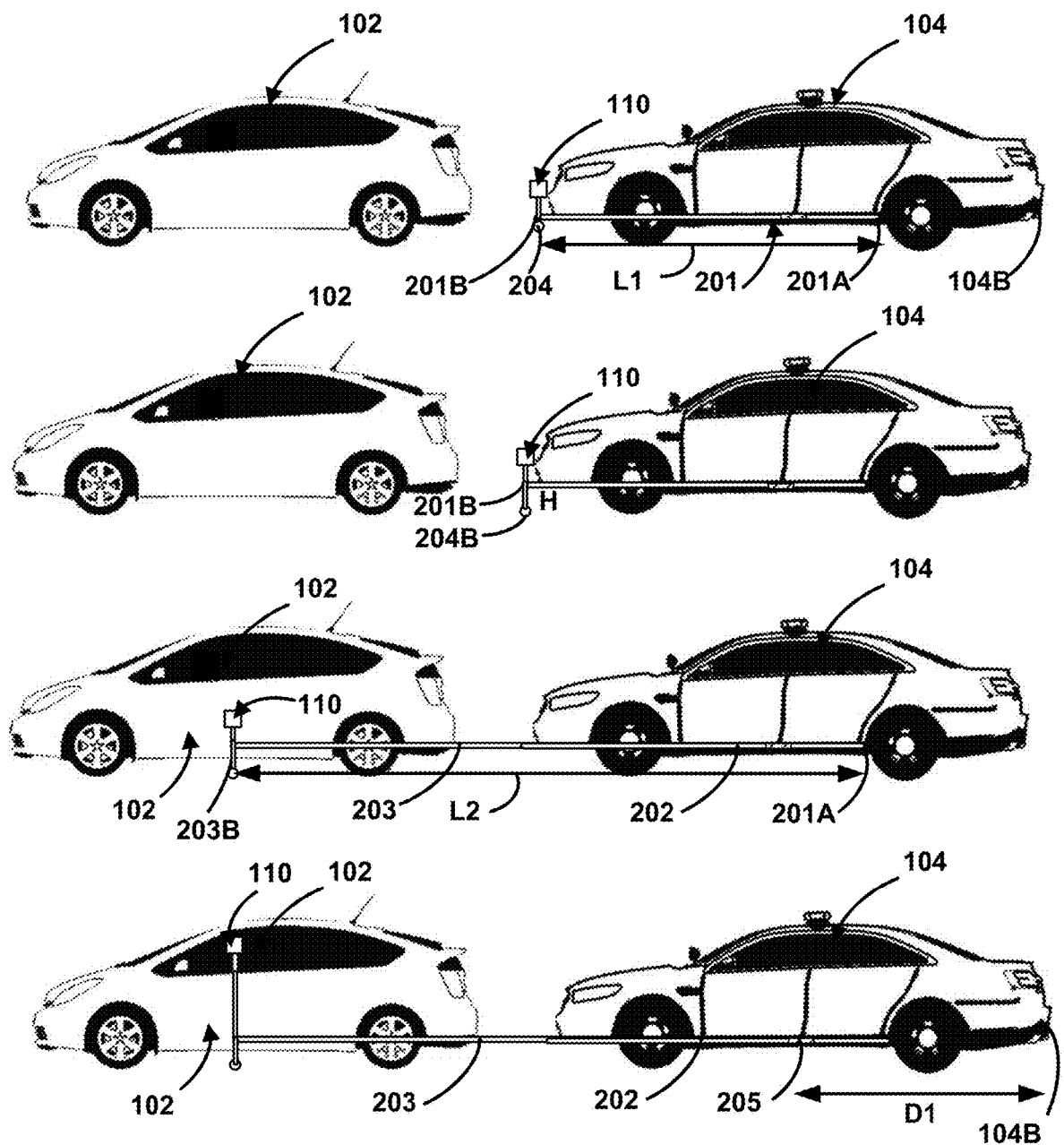
FIG. 2 is an example conceptual diagram illustrating the example vehicle mountable robotic and communication system in FIG. 1, where the delivery device includes an example extendable linear motion system.

In some examples, delivery device 124 can include a linear deployment mechanism, such as an extendable linear motion system, configured to transform from a retracted configuration to an extended configuration. Such a linear system may be relatively simple and/or inexpensive compared to other extension mechanisms, such as a rotary mechanism. FIG. 2 is an example conceptual diagram illustrating the example vehicle mountable robotic and communication system 100 in FIG. 1, in which the delivery device includes an example extendable linear motion system 201. Extendable linear motion system 201 can be configured to linearly extend along an axis, such that extendable linear motion system 201 can maintain better alignment during deployment and/or deploy within a smaller volume than a deployment mechanism that does not linearly extend along an axis.

Extendable linear motion system 201 can span any suitable length of second vehicle 104, where the length is measured from a distal end 201B of extendable linear motion system 201 to a proximal end 201A of extendable linear motion system 201. Extendable linear motion system 201 can be positioned at any suitable distance from distal end 104B of second vehicle 104. In some examples, extendable linear motion system 201 can include a plurality of slidable rails that includes a base rail 202 and at least one slidable rail 203 (e.g., one slidable rail, two slidable rails, or three slidable rails, etc.) that extend from a retracted configuration (also referred to herein as the first configuration) to an extended configuration (also referred to herein as the second configuration). Each slidable rail of the plurality of slidable rails is slidably coupled to another slidable rail of the plurality of slidable rails. In some examples, extendable linear motion system 201 can include a plurality of concentrically nested rails that includes an inner rail 202 and at least one outer rail 203 (e.g., one outer rail, two outer rails, or three outer rails, etc.) that extend from a retracted configuration (also referred to herein as the first configuration) to an extended configuration (also referred to herein as the second configuration). Each rail of the plurality of rails is nested inside another rail of the plurality of rails.

In some examples, the retracted configuration is a fully retracted configuration, which can be the configuration of extendable linear motion system 201 at a predetermined minimal length L1 (e.g., the distance L1 from the proximal end of 201A to distal end of 201B of extendable linear motion system 201). In some examples, the extended configuration can be a fully extended configuration, which is the configuration of the extendable linear motion system 201 at a predetermined maximum extended length L2 (e.g., the distance L2 from proximal end 201A to distal end 203B of extendable linear motion system 201), which can be selected to help prevent extendable linear motion system 201 from collapsing. In the extended configuration, rails eject away from second vehicle 104 such that extendable linear motion system 201 extends from second vehicle 104 to first vehicle 102 to deliver communication device 110 from second vehicle 104 to first vehicle 102. In some examples, in the extended configuration, extendable linear motion system 201 extends a distance of about eight feet to about twenty feet when fully extended.

Extendable linear motion system 201 can include one or more support devices configured to extend from distal end 201B of the extendable linear motion system 201 to ground to provide support for extendable linear motion system 201 and communication device 110. In the example shown in FIG. 2, the one or more support devices include support wheel 204. In some examples, support wheel 204 includes a touch sensor and an extendable stick configured to extend until support wheel 204 contacts the ground. In the example shown in FIG. 2, support wheel 204 is configured to extend a distance of about six inches to about two feet (e.g., the distance H from distal end 201B of extendable linear motion system 201 to ground 204B). Extendable linear motion system 201 can be formed from any suitable material, such as, but not limited to, polyamide, carbon steel, stainless steel, aluminum, copper, self-lubricating UHMW material, or the like.

Mount 126 (not shown) can be used to secure base rail 202 on second vehicle 104. In some examples, mount 126 can represent a tie-down bracket located at the bottom of the driver-side of second vehicle 104. In some examples, mount 126 can be located at mount location 205 at a distance D1 of about two feet to about six feet from distal end 104B of second vehicle 104. Mounting base rail 202 on a relatively high location can cause base rail 202 be difficult to notice by the occupant of second vehicle 104, which may injury he occupant. By mounting the base rail 202 at the bottom of second vehicle 104, the risk of injuring the occupant of second vehicle 104 can be significantly lowered.

Figure 3:
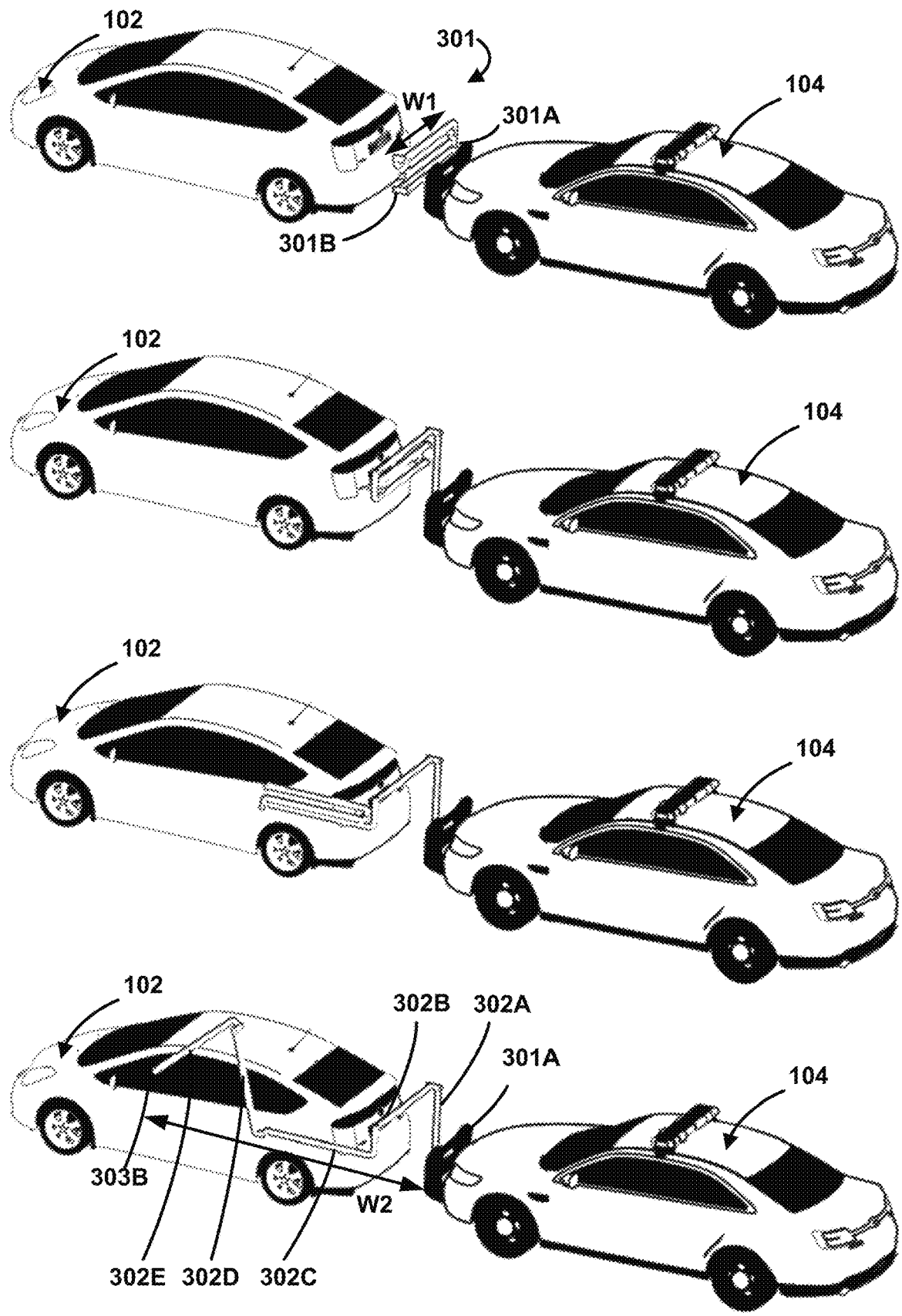
FIG. 3 is another example conceptual diagram illustrating the example vehicle mountable robotic and communication system in FIG. 1, where the delivery device includes an example linkage system.

In some examples, delivery device 124 can include a folding deployment mechanism, such as a linkage system, configured to transform from a folded configuration to an unfolded configuration. Such rotary linkage systems may enable a larger and less-restricted range of motion that allows the image capture device 706 to look all around the interior of the driver car 102, the ability to be mounted to the front/bull-bar of the second vehicle 104, and/or the ability to approach either driver or passenger side of driver car 102, whereas a linear system can approach only one side of the driver car 102 along a pre-defined path that does not allow for full inspection of the driver car 102 by image capture device 706. FIG. 3 is an example conceptual diagram illustrating the example vehicle mountable robotic and communication system in FIG. 1, in which delivery device 124 includes an example linkage system 301. Linkage system 301 can be configured to unfold, such that linkage system 301 can fit compactly in a storage compartment of second vehicle 104 or on a portion of second vehicle 104 in the folded configuration. In some examples, linkage system 301 can include links that are connected with each other using rotary joints.

In some examples, linkage system 301 can have a folded configuration with a longest dimension that is less than a dimension (e.g., width or length) of second vehicle 104, such that linkage system 301 can fit within a footprint of second vehicle 104. Linkage system 301 can span any suitable width of second vehicle 104, where the width W1 is measured from distal end 301B of linkage system 301 to proximal end 301A of linkage system 301. In some examples, a distance from distal end 301B of linkage system 301 to proximal end 301A of linkage system 301 can be about eight feet to about twenty feet.

Linkage system 301 can be configured to extend communication device 110 from second vehicle 104 to first vehicle 102 using a plurality of links. Each link of the plurality of links is coupled to another link of the plurality of links and is configured to pivot into a position in response to receiving a control signal. Linkage system 301 can include at least two links (e.g., two links, three links, or five links, etc.) that are connected with each other using rotary joints. In the example shown in FIG. 3, links 302A-302E (collectively "links 302") are connected with each other using rotary joints. In some examples, links 302 can have the same length (e.g., 302A-302E all have a length of about one foot to about five feet). As in other examples, at least two links can have different lengths.

Linkage system 301 can extend from a folded configuration to an unfolded configuration. In some examples, the folded configuration is a fully folded configuration, which is the configuration of linkage system 301 at a predetermined minimal length W1 (e.g., the distance W1 from the proximal end 301A to a midpoint 301B of linkage system 301). In some examples, the unfolded configuration is a fully unfolded configuration, which is the configuration of linkage system 301 at a predetermined maximum extended length W2 (e.g., the distance W2 from the proximal end 301A to the distal end 303B of linkage system 301). In the unfolded configuration, linkage system 301 extends from second vehicle 104 to first vehicle 102 to deliver communication device 110 from second vehicle 104 to first vehicle 102. In some examples, in the unfolded configuration, linkage system 301 extends a distance of about eight feet to about twenty feet when fully extended. Linkage system 301 can be formed from any suitable material, such as, but not limited to, polyamide, carbon steel, stainless steel, aluminum, copper, self-lubricating ultra-high molecular weight polyethylene (UHMW) material, or the like.

Mount 126 can be used to be secure linkage system 301 on second vehicle 104. In some examples, mount 126 can represent a bull-bar located at the front of second vehicle 104. While not shown in FIG. 3, in some examples, mount 126 can be housed within a storage compartment of second vehicle 104, such that linkage system 301 can be stored securely within second vehicle 104.

Linkage system 301 can provide the police officer in the second vehicle 104 the ability to control the delivery position of communication device 110, which can potentially improve the police officer's ability to observe various areas (e.g., driver side, passenger side, front side, backside, etc.) of first vehicle 102. For example, linkage system 301 can introduce a greater degree of motion and/or can be positioned in a greater field of vision than a deployment mechanism that does not include a folded and unfolded configuration or is not mounted on a front of second vehicle 104.

Figure 4:
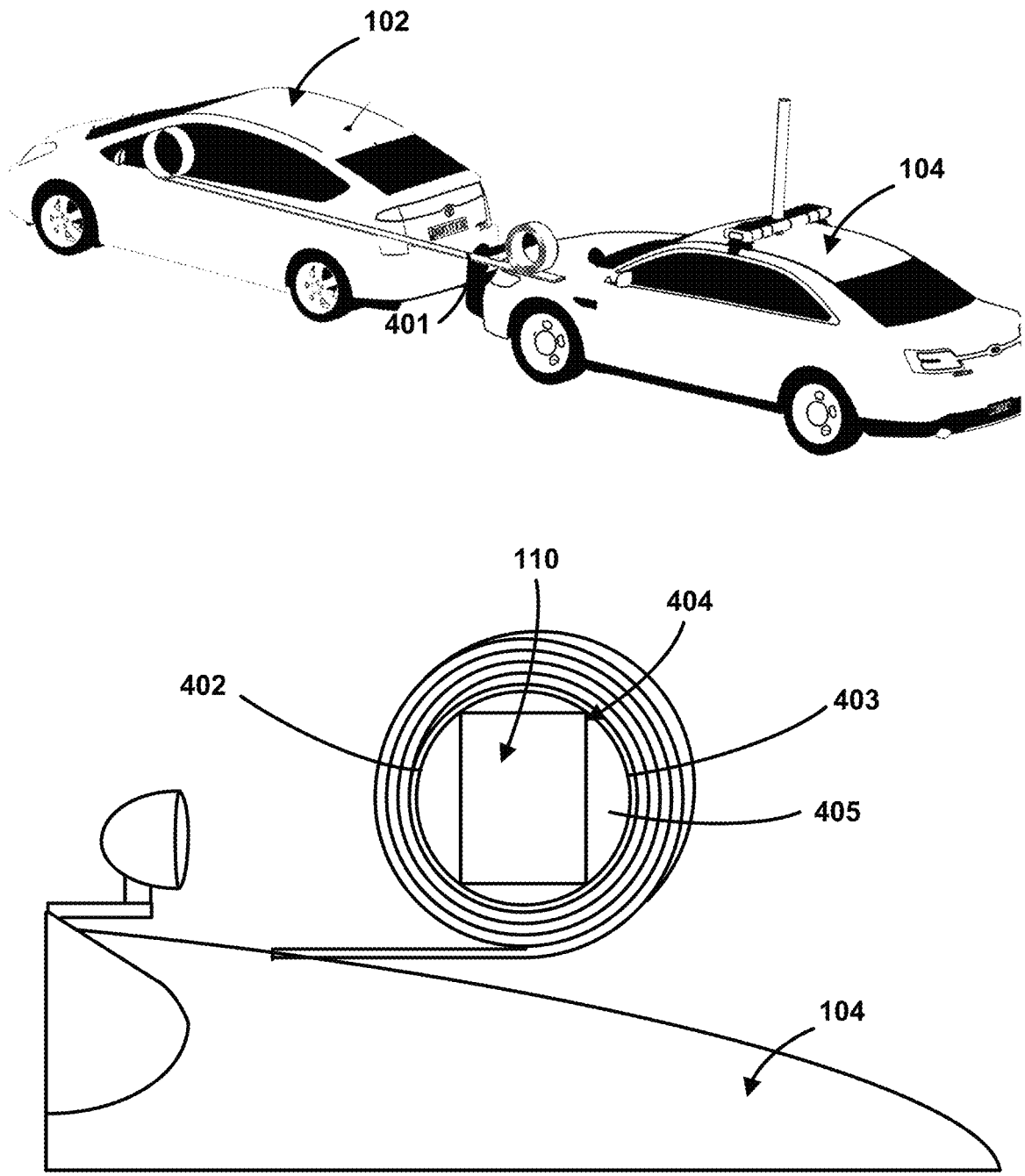
FIG. 4 is another example conceptual diagram illustrating the example vehicle mountable robotic and communication system in FIG. 1, where the delivery device includes an example rolling track.

In some examples, delivery device 124 can include a curled deployment mechanism, such as a rolling track, configured to transform from a curled configuration to a straightened configuration. Such rolling track systems may enable more compact storage, simpler control compared to extension mechanisms that use more complex forms of actuation, and/or less expensive manufacturing. FIG. 4 is an example conceptual diagram illustrating the example vehicle mountable robotic and communication system in FIG. 1, where the delivery device includes a rolling track 401. Rolling track 401 can be configured to roll and unroll along an axis tangential to the curled configuration, such that rolling track 401 can be stored in a compact configuration and/or permit delivery of communication device 110 at a variety of points along the axis.

Rolling track 401 can include a semi-closed drag chain configured to transform from a curled configuration to a straightened configuration. In some examples, in the straightened configuration, rolling track 401 extends from second vehicle 104 to first vehicle 102 to deliver communication device 110 from second vehicle 104 to first vehicle 102. In some examples, in the straightened configuration, rolling track 401 extends a distance of about eight feet to about twenty feet when fully extended.

Rolling track 401 can be configured to hold communication device 110. In some examples, inner chain links 402 of rolling track 401 wraps around and attaches to outer race 403 of ball-bearing 404, and communication device 110 attaches to or floats on inner race 405 of ball-bearing 404. Ball-bearing 404 allows the weight of communication device 110 to self-align its orientation with gravity so that its right-side-up at every position of rolling track 401. As rolling track 401 transforms from the curled configuration to the straightened configuration, rolling track 401 rolls out and extends from second vehicle 104 to first vehicle 102.

In some examples, a support structure, such as a vertical support rod, can be used to support rolling track 401 from above via a cable. For example, the vertical support rod may include one or more cables configured to provide support to rolling track 401, such as at fixed or adjustable points along rolling track 401. In some examples, the cables may be configured to exert a variable amount of force, such that, as rolling track 401 extends, the amount of supportive force from the cable is increased.

Rolling track 401 can be formed from any suitable material, such as, but not limited to, polyamide, carbon steel, stainless steel, aluminum, copper, shape memory alloys, or the like. In some examples, rolling track 401 can be inflated using a pneumatic device and rolling track 401 can be made of an inflatable material such as, but not limited to, polyethylene, polyethylene terephthalate (PET), nylon, a polyether block amide, polytetrafluoroethylene (PTFE), polyurethane, polyester, silicone, polyvinyl chloride, polypropylene, polyurethanes, polyamides, latex, natural rubber, synthetic rubber, or the like.

Figure 5:
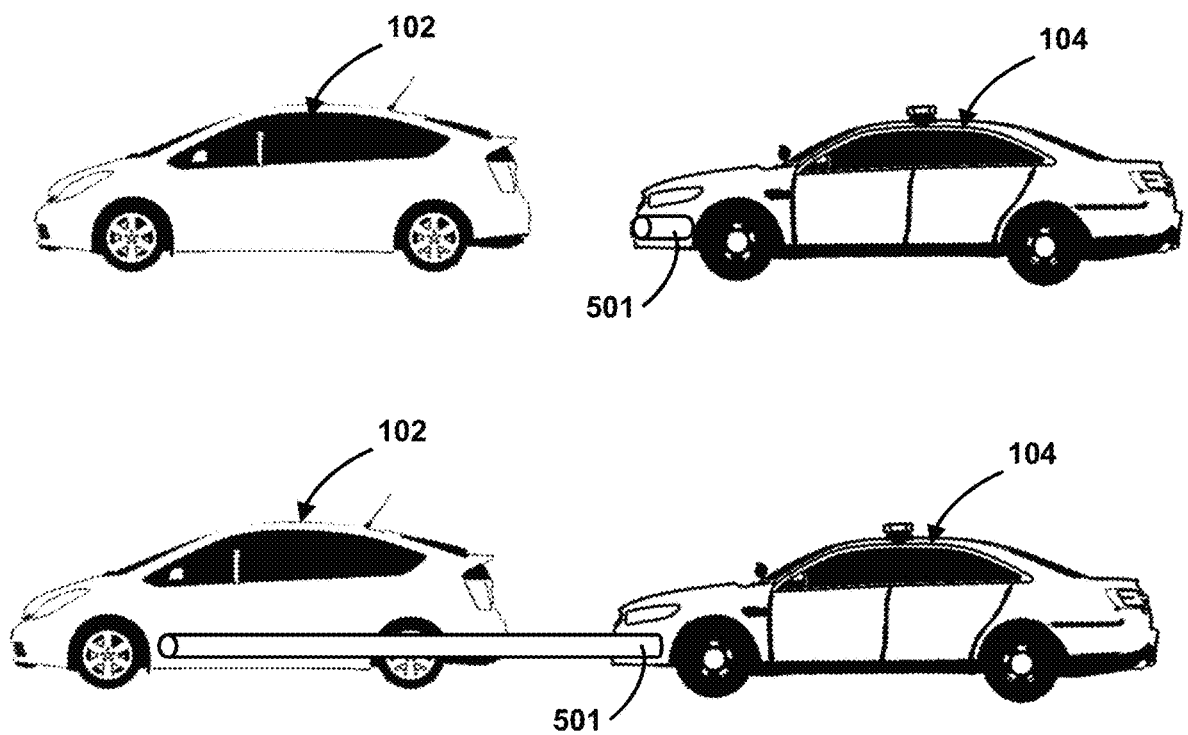
FIG. 5 is another example conceptual diagram illustrating the example vehicle mountable robotic and communication system in FIG. 1, where the delivery device includes an example everted tube.

In some examples, delivery device 124 can include an inflation deployment mechanism, such as an everted tube, configured to transform from a deflated configuration to an inflated configuration. FIG. 5 is another example conceptual diagram illustrating the example vehicle mountable robotic and communication system in FIG. 1, in which delivery device 124 includes an everted tube 501. Everted tube 501 can be configured to extend communication device 110 from second vehicle 104 to first vehicle 102.

Everted tube 501 can be flexibly extendable and configured to extend a length in response to receiving a control signal. Everted tube 501 can transform from a deflated configuration to an inflated configuration. In some examples, in the inflated configuration, everted tube 501 extends from second vehicle 104 to first vehicle 102 to deliver communication device 110 from second vehicle 104 to first vehicle 102. In some examples, in the inflated configuration, everted tube 501 extends a distance of about eight feet to about twenty feet when fully extended. Everted tube 501 can be formed from any suitable material, such as, but not limited to, polyethylene, polyethylene terephthalate (PET), nylon, a polyether block amide, polytetrafluoroethylene (PTFE), polyurethane, polyester, silicone, polyvinyl chloride, polypropylene, polyurethanes, polyamides, latex, natural rubber, synthetic rubber, or the like.

Figure 6:
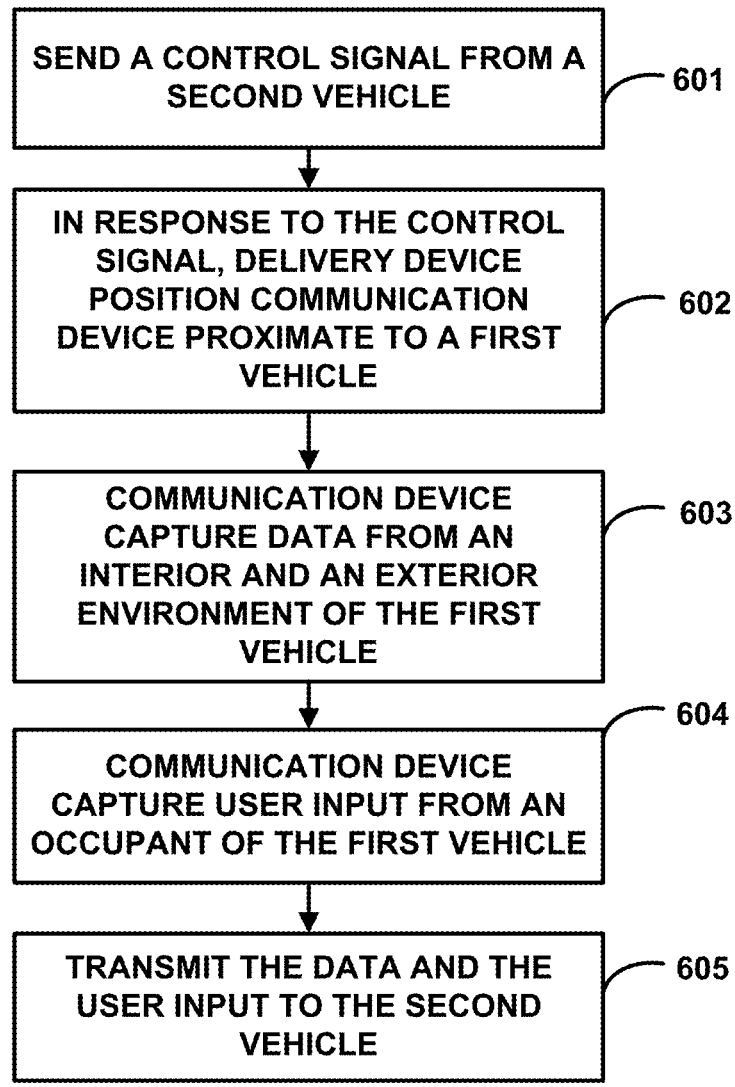
FIG. 6 is a flow diagram of an example technique for facilitating communications between an occupant of a first vehicle and an occupant of a second vehicle using the vehicle mountable robotic and communication system in FIG. 1, in accordance with embodiments discussed herein.

FIG. 6 is a flow diagram of an example technique for facilitating communications between an occupant of a first vehicle and an occupant of a second vehicle using the vehicle mountable robotic and communication system in FIG. 1, in accordance with embodiments discussed herein. FIG. 6 may be described with respect to vehicle mountable robotic and communication system 100 of FIG. 1; however, it will be understood that other vehicle mountable robotic and communication systems may be used with the techniques of FIG. 6.

In the technique shown in FIG. 6, a police officer in second vehicle 104 (i.e., the police vehicle) may alert the driver in first vehicle 102 (i.e., the detained vehicle) to pullover using standard police lights and/or bullhorn, approach first vehicle 102 to a relatively close position, and send a control signal to delivery device 124 (601).

In response to receiving the control signal, delivery device 124 can position communication device 110 proximate to first vehicle 102 (602). For example, delivery device 124 can transform from a first configuration to a second configuration to deliver communication device 110 to an occupant in first vehicle 102.

Communication device 110 can be configured to capture data from an interior and/or exterior environment of first vehicle 102 (603). For example, communication device 110 can include image capture device 112, such as a camera, configured to capture real-time video of the occupant in first vehicle 102. As another example, communication device 110 can include an environmental sensor, such as a passive alcohol sensor, configured to detect the presence or absence of an analyte, such as alcohol, in first vehicle 102.

Communication device 110 can capture user input from the occupant of first vehicle 102 (604). For example, communication device 110 can include an image scanner configured to capture the barcode on the backside of the driver's license. During a temporary traffic detention, the police officer in second vehicle 104 can request the occupant of first vehicle 102 to provide the occupant's driver's license. In response, the occupant of first vehicle 102 may hold the occupant's driver's license in front of communication device 110, and communication device 110 can capture the barcode on the backside of the driver's license as user input.

Communication device 110 can then transmit the data and the user input to second vehicle 104 (605). For example, the data and/or user input can be transmitted in real-time to facilitate two-way communication.

In this way, delivery device 124 can deliver communication device 110 from second vehicle 104 to first vehicle 102 to facilitate communications between an occupant of first vehicle 102, such as a driver in a detained vehicle, and an occupant of second vehicle 104, such as a police officer in a police vehicle, while allowing both the police officer and the driver to remain in vehicles without significantly affecting the human-to-human interactions.

Figure 7:
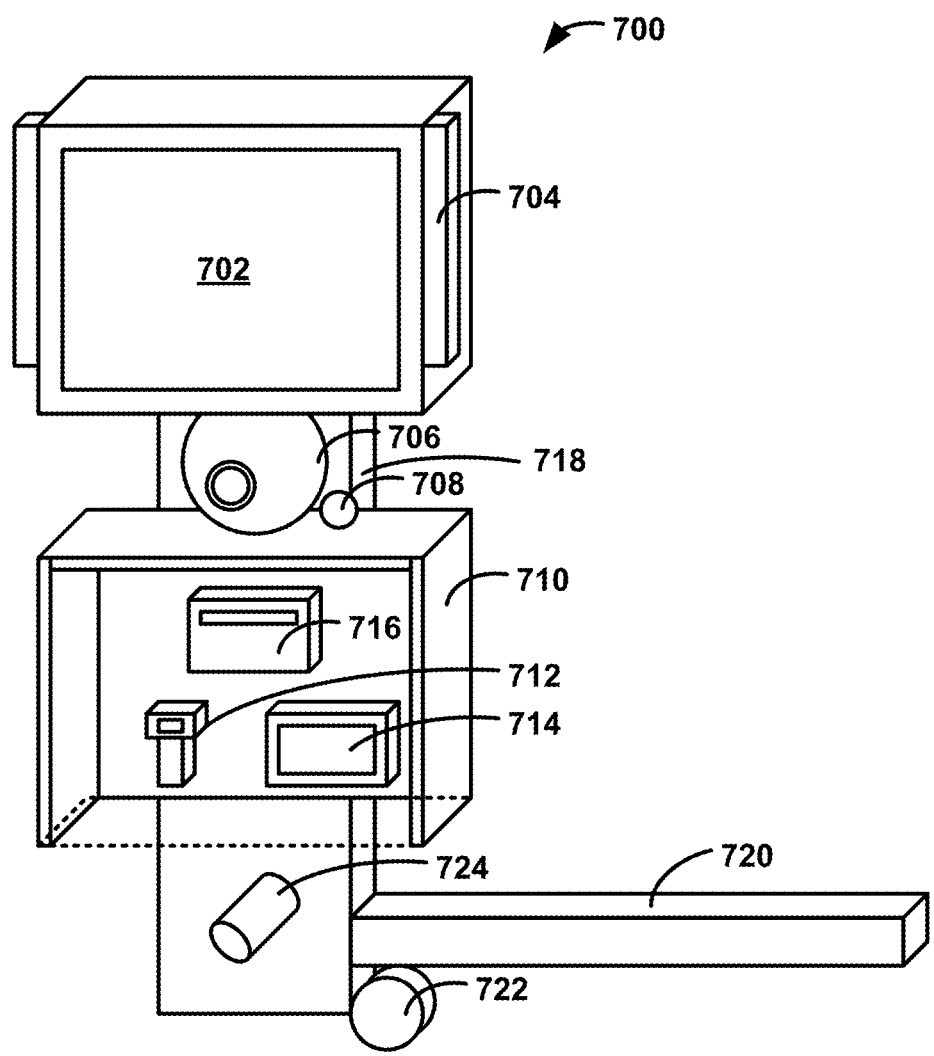
FIG. 7 is a perspective view diagram of an example communication device 700, in accordance with embodiments discussed herein.

FIG. 7 is a perspective view diagram of an example communication device 700, such as communication device 110 of FIG. 1. Components of communication device 700 may be configured with similar characteristics as similarly functional devices of communication device 110 of FIG. 1. In the example of FIG. 7, communication device 700 includes several waterproof components, such as an image output device 702, an audio output device 704, an image capture device 706, an audio capture device 708, and a vertical positioning device 724. Vertical positioning device 724 can be configured to set a vertical position of communication device 700. Communication device 700 also include several non-waterproof devices housed in a waterproof housing 710, such as image scanner 712, signature pad 714, and printer 716. Image scanner 712 can be configured to scan image of documents, such as driver's license or car registration, during a traffic stop. Signature pad 714 can be configured to receive an electronic or digital signature, such as for a traffic citation, from an occupant of a vehicle. Printer 716 can be configured to print out a copy of a document, such as the traffic citation. Communication device 700 can include a frame 718 that supports components of communication device 700 and couples to a delivery device 720 and a support wheel 722. While not shown, in other examples, communication device 700 can include other sensors configured to assist in positioning communication device 700. For example, delivery device 124 can be configured to automatically position communication device 700, such as by distance or proximity sensors on communication device 700 that indicate a position of communication device 700 from first vehicle 102 (e.g., within a few feet of a side or window of first vehicle 102 or the ground).

FIG. 8 is a perspective view diagram of an example interface system 800 of a detaining vehicle for communicating with and controlling a communication device, such as communication device 110 of FIG. 1. Components of interface system 800 may be configured with similar characteristics as similarly functional devices of communication device 110 of FIG. 1. Interface system 800 includes an image output device 802, an audio output device 804, an image capture device 806, an audio capture device 808, and a positioning control device 810. Positioning control device 810 can be configured to send control signals to a delivery device, such as delivery device 124 of FIG. 1, to control a position of a communication device, such as communication device 110 of FIG. 1. In some examples, positioning control device 810 can include both manual controls, such as an analog joystick having control in 2 or 3 dimensions, and automatic control, such as one or more buttons that correspond to a configuration of the delivery device, such as a deployed or undeployed configuration.

Various examples have been described. These and other examples are within the scope of the following claims.

What is claimed is:

1. A vehicle mountable robotic and communication system, comprising:
    a communication device configured to:
        capture data from an interior and an exterior environment of a first vehicle;
        capture user input from an occupant of the first vehicle;
        transmit the data and the user input to a second vehicle; and
    a delivery device configured to extend the communication device from the second vehicle to the first vehicle and position the communication device proximate to the first vehicle, wherein the delivery device comprises at least one of an extendable linear motion system, a linkage system, a rolling track, or an everted tube.

2. The vehicle mountable robotic and communication system of claim 1, wherein the communication device comprises:
    an image capture device configured to capture image data from the interior and the exterior environment of the first vehicle;
    an audio capture device configured to capture audio data from the interior and the exterior environment of the first vehicle; and
    a user interface device.

3. The vehicle mountable robotic and communication system of claim 2, wherein the communication device further comprises:
    an image output device configured to output real-time image data to the interior and the exterior environment of the first vehicle; and
    an audio output device configured to output real-time audio data to the interior and exterior the environment of the first vehicle.

4. The vehicle mountable communication system of claim 2, wherein the user interface device comprises at least an image scanner or a touch-sensitive panel.

5. The vehicle mountable robotic and communication system of claim 1, wherein the communication device further comprises a physical output device.

6. The vehicle mountable robotic and communication system of claim 5, wherein the physical output device comprises a printer.

7. The vehicle mountable robotic and communication system of claim 2, wherein the communication device further comprises one or more environmental sensors configured to capture environmental data from the interior and the exterior environment of the first vehicle, wherein the environmental data indicates a presence or concentration of an analyte in the interior or the exterior environment of the first vehicle.

8. The vehicle mountable robotic and communication system of claim 1, wherein the delivery device comprises the extendable linear motion system wherein the extendable linear motion system comprises a plurality of slidable rails, wherein each slidable rail of the plurality of slidable rails is coupled to another slidable rail of the plurality of slidable rails, and wherein at least one slidable rail of the plurality of slidable rails is configured to extend relative to another slidable rail of the plurality of slidable rails in response to receiving a control signal.

9. The vehicle mountable robotic and communication system of claim 8, wherein the delivery device further comprises one or more support devices configured to extend from a distal end of the extendable linear motion system to a ground to provide support for the delivery device and the communication device.

10. The vehicle mountable robotic and communication system of claim 9, wherein the one or more support devices comprises a support wheel.

11. The vehicle mountable robotic and communication system of claim 1, wherein the delivery device comprises the extendable linear motion system wherein the extendable linear motion system comprises a plurality of concentrically nested rails, wherein each rail of the plurality of rails is nested inside another rail of the plurality of rails, and wherein at least one rail of the plurality of rails is configured to extend relative to another slidable rail of the plurality of rails in response to receiving a control signal.

12. The vehicle mountable robotic and communication system of claim 1, wherein the delivery device comprises the linkage system, wherein the linkage system comprises a plurality of links, wherein each link of the plurality of links is coupled to another link of the plurality of links by rotary joints, and wherein each link of the plurality of links is configured to pivot into a position in response to receiving a control signal.

13. The vehicle mountable robotic and communication system of claim 12, wherein the delivery device comprises one or more support devices configured to extend from the linkage system to the ground.

14. The vehicle mountable robotic and communication system of claim 1, wherein the delivery device comprises the rolling track, wherein the rolling track is flexibly extendable along a tangential axis of the rolling track, and wherein the rolling track is configured to extend a length in response to receiving a control signal.

15. The vehicle mountable robotic and communication system of claim 1, wherein the delivery device comprises the everted tube, wherein the everted tube is extendable, and wherein the everted tube is configured to extend a length in response to receiving a control signal.

16. The vehicle mountable robotic and communication system of claim 15, wherein the everted tube is inflatable.

17. The vehicle mountable robotic and communication system of claim 1, further comprising an immobilization device configured to position in front of a wheel of the first vehicle to prevent the occupant of the first vehicle driving off.

18. The vehicle mountable robotic and communication system of claim 1, further comprising a mount configured to secure the delivery device to the second vehicle.

19. The vehicle mountable robotic and communication system of claim 18, wherein the mount comprises at least one of tie-down bracket or a bull bar.

20. A method, comprising:
receiving, by a delivery device, a control signal from a second vehicle, wherein the delivery device is configured to extend the communication device from the second vehicle to the first vehicle, wherein the delivery device comprises at least one of an extendable linear motion system, a linkage system, a rolling track, or an everted tube;
positioning, by the delivery device and in response to receiving the control signal, a communication device proximate to a first vehicle;
capturing, by the communication device, data from an interior and an exterior environment of the first vehicle;
capturing, by the communication device, user input from an occupant of the first vehicle; and
transmitting, by the communication device, the data and the user input to the second vehicle.

\* \* \* \* \*